Aug. 31, 1948.　　　L. A. HOLAN ET AL　　　2,448,430
INTERNAL-COMBUSTION ENGINE
Filed June 3, 1946　　　　　　　　　　　2 Sheets-Sheet 1
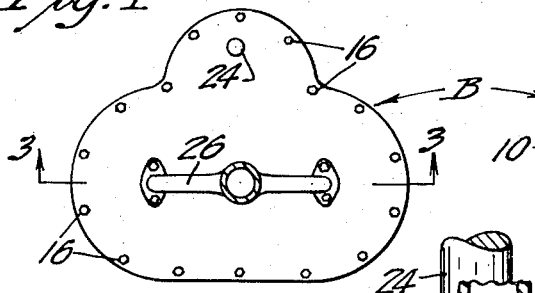
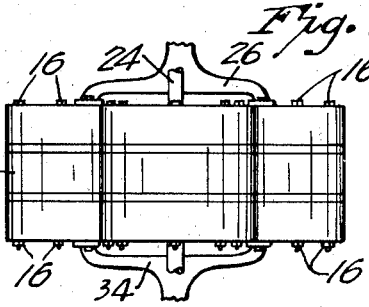
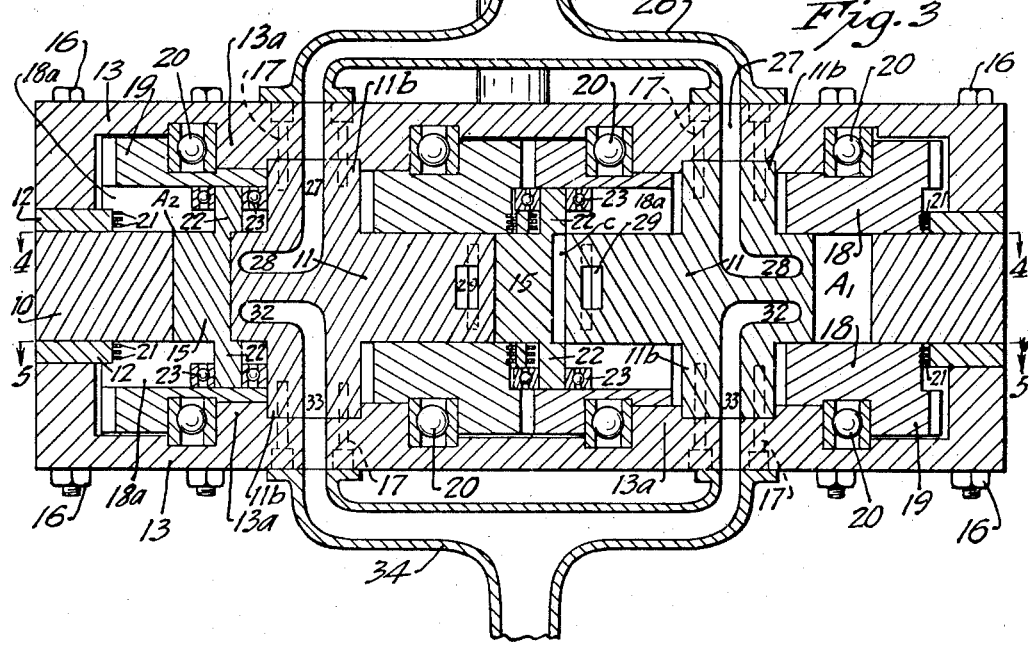
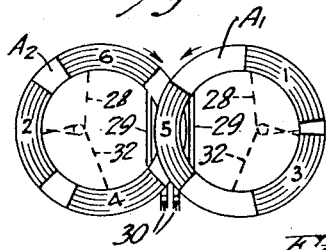
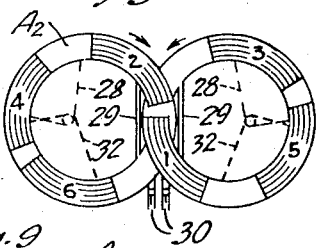
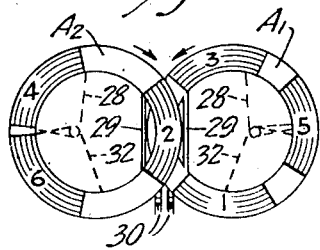
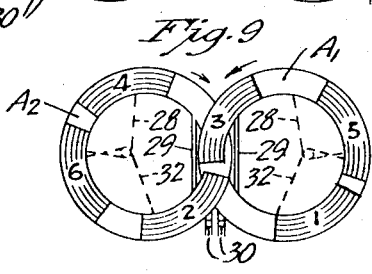
Inventors
Leif A. Holan
Joseph O. Bourdeaux
By Williamson & Williamson
Attorneys

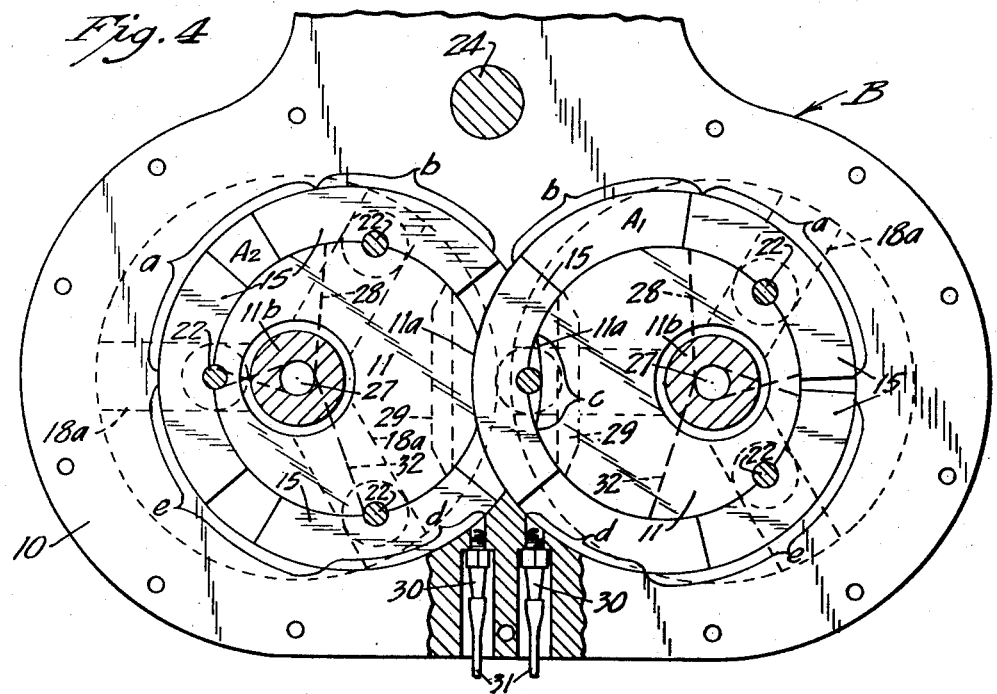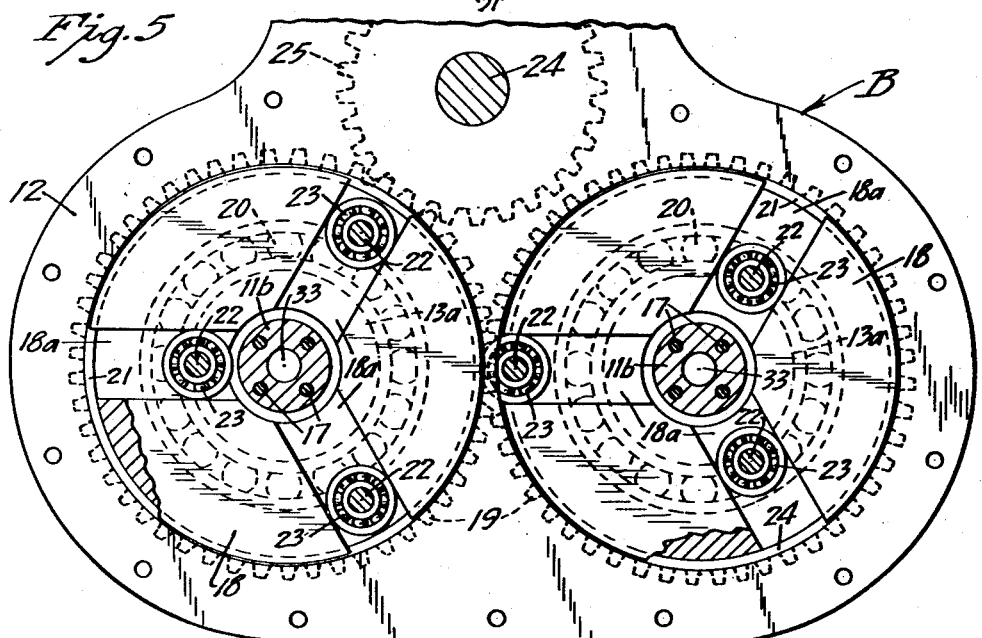

Patented Aug. 31, 1948

2,448,430

UNITED STATES PATENT OFFICE 2,448,430

INTERNAL-COMBUSTION ENGINE

Leif A. Holan and Joseph O. Bourdeaux, Minneapolis, Minn.; said Bourdeaux assignor of one-sixth to said Holan Application June 3, 1946, Serial No. 673,982

17 Claims. (Cl. 123—12)

This invention relates to internal combustion engines.

It is one of the objects of this invention to provide a novel, improved internal combustion engine having but relatively few moving parts and so constructed as to avoid the necessity for crank shaft, connecting rods, and numerous other parts found in the conventional internal combustion engine now in use.

Another object is to provide such an internal combustion engine wherein the pistons of the engine act as valves controlling intake and exhaust ports, thereby eliminating the necessity for the usual intake and exhaust valves and the attendant valve operating parts.

Another object is to provide an internal combustion engine having a piston chamber through which a plurality of pistons move successively through intake, compression, firing, and exhaust zones, movement of the pistons being so regulated that, as they pass through the intake zone there is a relative movement of adjacent pistons away from each other to cause a charge to be drawn into the intake zone and as said pistons move through said exhaust zone, there is a relative movement of adjacent pistons toward each other so as to expel the spent charge from the exhaust zone.

A further object is to provide in such an engine as referred to in the last paragraph above, means for blocking off a portion of the chamber between the compression zone and the firing zone to permit of the compression of the charge in the compression zone and to permit of the firing of the charge in the firing zone, there being a by-pass passage between the compression zone and the firing zone controlled through movement of the pistons through said chamber.

A further object is to provide an internal combustion engine including a block having two circular piston chambers therein intersecting each other to form a common blocking zone, said chambers each having intake, compression, firing, and exhaust zones, and the common blocking zone being located between the compression and firing zones of the two chambers, a plurality of pistons working through each of said chambers, means for supplying a combustible mixture to the intake zones, means for igniting the charges in the firing zones, means permitting the exhaust of the spent charges from the exhaust zones said block having by-pass passages between the compression and firing zones of the respective chambers, and means for guiding the pistons of the two chambers therethrough in such relationship that, as the pistons work through said intake zones, they will act to draw a charge into the same, and as they work through said exhaust zones, they will act to scavenge the exhaust gases from the exhaust zones, the pistons of respective chambers working through said common blocking zone in alternation to make possible the compression of the charges and the firing of the charges in the respective chambers.

The objects and advantages of the invention will more fully appear from the following description made in connection with the accompanying drawings, wherein like reference characters refer to the same or similar parts throughout the various views and in which:

Fig. 1 is a plan view illustrating an engine embodying the invention.

Fig. 2 is a view in side elevation of the engine.

Fig. 3 is a vertical section taken on the line 3—3 of Fig. 1 as indicated by the arrows.

Fig. 4 is a horizontal section taken on the line 4—4 of Fig. 3 as indicated by the arrows.

Fig. 5 is a horizontal section taken on the line 5—5 of Fig. 3 as indicated by the arrows, Figs. 3, 4, and 5 being shown in enlarged scale relative to Figs. 1 and 2; and Figs. 6, 7, 8, and 9 are diagrammatic views showing the positions that the pistons of the engine will take in the piston chambers during the initial periods of intake, compression, firing, and exhaust, respectively, of a single charge.

As the invention is shown in the illustrated embodiment, the block B of the engine is of substantially cloverleaf shape in plan view and includes several individual block sections, among which are what may be called external piston block section 10, two internal piston block sections 11, upper and lower seal block sections 12, and upper and lower cap block sections 13.

The external and internal piston block sections 10 and 11 cooperate to form the side walls of two circular piston chambers designated respectively $A_1$ and $A_2$. These circular piston chambers intersect each other to form a common blocking zone $c$ through which arcuate pistons 15, which work through the piston chambers $A_1$ and $A_2$, may travel. At points adjacent the common zone $c$ the internal piston block sections 11 are provided with arcuately notched portions 11a to permit the movement of the pistons 15 through this common zone. The spacing between the central axes, about which the walls of the chambers $A_1$ and $A_2$ are evolved, is slightly less than the difference between twice the radius of an external wall of these chambers and the radial width of the chambers.

The external piston block section 10 and the two internal piston block sections 11 are vertically centrally located relative to the seal block sections 12 and the cap block sections 13, the seal block sections being located one at either side of the external piston block section 10 and the cap block sections 13 being located respectively above and below the respective seal block sections 12. The two internal piston block sections 11 have stems 11b which project above and below the main portions of the blocks 11 and fit at their ends within recesses formed in the cap block sections 13. The block sections 13, 12, and 10 are secured together as by nutted bolts 16 and the internal piston block sections 11 are secured in place as by means of bolts 17 running through the cap block sections 13 and secured in tapped openings formed in the stems 11b.

The arcuate pistons 15, which work through the two piston chambers A1 and A2, of course revolve about axes from which the two chambers A1 and A2 are respectively evolved. Rotating about axes parallel to but eccentric to the axes about which the pistons 15 revolve are upper and lower piston guiding rotors 18 for each piston chamber A1 and A2, and these rotors 18 are preferably formed integrally respectively with upper and lower gears 19, the two upper gears intermeshing with each other and the two lower gears intermeshing with each other. To receive the combined rotors 18 and gears 19, the cap block sections 13 are recessed and equipped with bosses 13a, the gears 19 riding on bearings, such as the anti-friction ball bearings 20, interposed between the bosses 13a and the gears 19. The seal block sections 12 are apertured to receive the rotors 18 and the rotors are grooved at their edges to carry seal rings 21, which fit within the apertures in the seal block sections 12 and bear against the internal walls thereof whereby the rings 21 working in conjunction with the pistons 15, the rotors 18 and the seal block sections 12 seal off the open tops and bottoms of the piston chambers A1 and A2.

The pistons 15 have, projecting from their tops and bottoms at their central portions, pins 22, the axes of which are either in line with or inwardly disposed from the inner surfaces of the pistons taken toward the central axes about which the pistons revolve, and the inward offsetting of these pins 22 is for the purpose of permitting sufficient longitudinal movement of the pins 22 relative to the rotors 18 as will presently appear. The pins 22 carry above and below the adjacent seal block sections 12 bearings, such as the anti-friction ball bearings, 23, which work within guide slots 18a radially cut at equal circumferentially spaced intervals in the piston guiding rotors 18. With this arrangement it will be seen that, as the pistons 15 revolve in the piston chambers A1 and A2, the respective rotors 18 will control the spacing between the pistons working in the respective chamber A1 or A2 and that the piston pins 22 may have a movement inwardly and outwardly along radial lines relative to the centers of rotation of the rotors 18. In the particular engine illustrated, there are three pistons 15 working in each chamber A1 and A2, and accordingly there are three guide slots 18a formed in each rotor 18. The upper and lower pairs of gears 19 are so meshed together for timing purposes of the pistons working through the two chambers A1 and A2 that, as best seen in Fig. 5, the guide slots 18a of the rotors 18 working in conjunction with one of the chambers A1 are set sixty degrees ahead of the guide slots 18a of the rotors, working in conjunction with the other cylinder A2. Also it should be noted that in the illustrated embodiment the axes of rotation of the rotors 18 are in the same plane as the axes about which the pistons rotate but the axes of rotation of the rotors are respectively eccentrically offset outwardly from the respective axes of rotation of the pistons 15 relative to the common zone C of the two chambers A1 and A2.

A drive shaft 24 extends through and is journalled in the block B for rotation about an axis parallel to the axes of rotation of the gears 19, and this shaft carries upper and lower gears 25, which mesh with the vertically aligned gears 19 at one side of the engine but do not mesh with the gears 19 at the other side of the engine. The gears 25 fit within recesses in the cap block sections 13.

Each piston chamber A1 and A2 has an intake zone a, a compression zone b, the zone c which may be referred to as a blocking zone and which is common to both chambers, a firing zone d, and an exhaust zone e, and the pistons 15 travel through these various zones in the order in which they are named. The limits of these different zones are indicated by brackets, Fig. 4, adjacent the letters designating these zones. There is provided a fuel intake manifold 26, which has two branches secured to the upper cap block section 13, and the branches of the intake manifold communicate with intake passages 27 running through the upper cap block section 13 and the respective internal piston block sections 11 and communicating with intake ports 28 running through the walls of the respective internal piston block sections 11 and communicating with the intake zones a of the two chambers A1 and A2. A combustible fuel mixture is adapted to be supplied in conventional manner as by means of a carburetor (not illustrated) to the intake manifold 26. Affording communication between the piston exit ends of the compression zones b and the piston entrance ends of the firing zones d of the respective chambers are by-pass passages 29 running respectively through the respective internal piston block sections 11, these by-pass passages 29 being preferably quite narrow at their ends where they communicate with the chambers A1 and A2 for rapid control of the same by the pistons 15 and being preferably widened but reduced in height intermediate their ends, as best shown in Figs. 3 and 4. The by-pass passages 29 bridge the space formed by the common blocking zone c of the two piston chambers to at times convey the compressed charges from the compression zones b to the firing zones d without passing through the common blocking zone c.

To ignite the compressed charges in the firing zones d the external piston block section 10 may be bored and tapped to receive spark plugs 30 having direct communication with the firing zones d. Electrical conduits 31 are shown as being connected to the spark plugs 30 and these plugs will be energized in the conventional manner as by a source of electrical energy controlled by an ordinary distributor (not illustrated) operating in timed relation with the pistons. There are exhaust ports 32 in communication with the exhaust zones e of the piston chambers, these exhaust ports running through the walls of the internal piston block sections 10 and communicating with exhaust passages 33 extending through the internal piston block sections 11 and the lower cap block section 13 and communicating with a two-branched exhaust manifold 34 from which the spent gases may be discharged.

Operation

Each plug 30 for the two piston chambers $A_1$ and $A_2$ will be timed to fire just after the rear end of each piston 15, working in the chamber for which the plug is employed, has moved past the outlet end of the adjacent by-pass passage 29. As the engine is placed in operation, the pistons in piston chamber $A_1$ will rotate in a counterclockwise direction as viewed in Figs. 4 and 5, while the pistons in piston chamber $A_2$ will rotate in a clockwise direction. As the pistons 15 revolve in one of the piston chambers, a relative movement between adjacent pistons will be produced due to the guiding action of the piston guiding rotors 18, this relative movement being such that adjacent ends of adjacent pistons will move away from each other in the intake zone $a$ and they will move toward each other in the exhaust zone $e$. The spacing between the adjacent ends of adjacent pistons 15 working within a single chamber $A_1$ or $A_2$ gradually increases through the intake zone $a$ and the compression zone $b$ from a very closely spaced relation at the entrance end of the intake zone $a$ until the pistons reach their greatest spacing midway of the common blocking zone $c$. Similarly the spacing between adjacent ends of pistons gradually decreases as the pistons work through the firing zone $d$ and the exhaust zone $e$. The pistons, as they move through one of the piston chambers, have a valve action to alternately open and close fuel intake ports 28, the entrance ends and discharge ends of the by-pass chambers 29, and the exhaust ports 32. As a piston 15, working within the right-hand chamber $A_1$ for example, moves through the common blocking zone $c$, it seals and blocks the passage of the compressed charge from the compression zone $b$ of the left-hand chamber $A_2$ through the common blocking zone $c$ to the firing zone $d$ of the chamber $A_2$. In similar manner, the pistons, working in the left-hand chamber $A_2$ and successively running through the common blocking zone $c$, block off communication in the right-hand chamber $A_1$ from the compression zone $b$ through the common blocking zone $c$ to the firing zone $d$. At the time the pistons in one chamber work through the common blocking zone $c$, the adjacent pistons of the other chamber are spaced far enough apart so that the pistons of the first chamber will not collide with or interfere with the pistons of the other chamber.

Referring now to Figs. 6, 7, 8, and 9, the intake, compression, firing, and exhaust of a single charge as it works through the engine are there diagrammatically illustrated. In these views successive pistons working through the chamber $A_1$ are designated as the 1, 3, and 5 pistons, while successive pistons running through the chamber $A_2$ are designated as the 2, 4, and 6 pistons. In Fig. 6 the relative position of the various pistons is shown as a combustible charge is just beginning to be drawn into the intake zone $a$ of the right-hand piston chamber $A_1$ between the No. 1 piston and the No. 3 piston. As the pistons rotate from the position shown in Fig. 6, the piston 1 draws away from the piston 3 to suck in a charge through the intake port 28 of the chamber $A_1$. Thereupon the pistons rotate to the position shown in Fig. 7, that is, to a point where piston 1 has moved through the common blocking zone $c$ and the forward end of piston No. 2 has just entered the common blocking zone $c$ to seal off communication between the compression zone $b$ and the firing zone $d$ of piston chamber $A_1$. The charge that has just previously been drawn into the chamber $A_1$ between the No. 1 and the No. 3 pistons is now located, as seen in Fig. 7, between the No. 3 piston and the No. 2 piston, and of course the entrance to the by-pass passage 29 for the right-hand chamber $A_1$ is open inasmuch as the No. 1 piston has moved past this entrance. The outlet of this same by-pass chamber 29 is closed by the No. 1 piston. As the pistons now continue to rotate beyond their position as shown in Fig. 7, the recently drawn-in charge in chamber $A_1$ is compressed due to the movement of the No. 3 piston toward the No. 2 piston. This compressed charge is forced into the right by-pass chamber 29 through the entrance thereof, and the charge cannot escape from this by-pass chamber until after the No. 1 piston has moved past the outlet of the said by-pass passage 29 or to the firing position shown in Fig. 8.

As the No. 1 piston now moves past the outlet of the by-pass passage 29 for the chamber $A_1$, the No. 3 piston closes the intake to the right by-pass passage 29 and the compressed charge is admitted to the small space now formed, as shown in Fig. 8, between the rear end of the No. 1 piston and the No. 2 piston, which occupies the major portion of the common blocking zone $c$. As the parts move to the position shown in Fig. 8, the spark plug 30 for the chamber $A_1$ fires to ignite the compressed charge filling the by-pass passage 29 of chamber $A_1$ and the space between the rear end of piston 1 and piston 2. As the compressed charge is ignited by the spark from the said plug 30, the charge explodes and reacts between the piston 2 and the rear end of the piston 1 to drive the piston ahead. The power transmitted by the explosion of the charge to the piston 1 is in turn transmitted from this piston through the pins 22 carried thereby to the right-hand piston guiding rotors 18 whereby all the movable parts of the engine are driven.

The pistons then continue to revolve in their cylinders until they have reached the exhaust position shown in Fig. 9. As they arrive at this position, the forward end of No. 3 piston is just emerging from the common blocking zone $c$ and the rear end of the No. 1 piston is just beginning to expose the exhaust port 32 for the chamber $A_1$. At this time there is a relative movement of the forward end of the piston 3 toward the rear end of the piston 1, and this relative movement forces the spent exploded gases through the right-hand exhaust port 32 to scavenge the exploded charge from the chamber $A_1$. The parts then again move to the intake position shown in Fig. 6, whereupon a new cycle of operation commences.

Through each complete revolution of the various pistons through their respective chambers $A_1$ and $A_2$, six complete cycles of operation will be accomplished; in other words, six charges will be taken in, compressed, fired, and exhausted so that during each complete revolution six power strokes will be imparted. In other words, while the pistons 2, 4, and 6 of the chamber $A_2$ coact with the pistons 1, 3, and 5 of the chamber $A_1$ to produce three power strokes, in like manner the pistons 1, 3, and 5 of the chamber $A_1$ coact with the pistons 2, 4, and 6 of the chamber $A_2$ to produce three power strokes in this chamber.

It should be noted, as best shown in Fig. 3, that, after a charge has been fired, for example, the charge between the piston 2 and the rear end of the piston 1, the piston 2 seals the blocking zone 2 until such time as the piston 1 has moved to expose the exhaust port 32 for the right-hand chamber A₁. It is quite important that the piston 2 remains in the blocking zone c until the exhaust port 32 opens, inasmuch as if the piston 2 emerged from the blocking zone c before the exhaust port 32 opened the reactive force of the exploded charge would work against the forward end of the piston 3 tending to cause the pistons of the right-hand chamber to turn in a clockwise direction instead of a counterclockwise direction and producing back pressure. Actually in the illustrated embodiment, the exhaust ports extend through approximately 97° of the chambers A₁ and A₂ while the intake ports 28 extend through approximately 79° to 80°, and while the length of the ports can be varied in relation to the circular piston chambers A₁ and A₂, care must be taken that the exhaust ports of one chamber open simultaneously with or just ahead of the time of the unblocking of the common zone c by a piston working within the other chamber.

Now, referring back again to Figs. 1 to 5 of the drawings, as a charge is fired, the power that is applied to the piston 15 of the energized piston is transmitted through the two pins 22 of that piston and the bearings 23 attached to these pins to the particular piston guiding rotors 18 with which the said bearings 23 of that particular piston engage. The right and left rotors 18, being attached to or integrally formed with the gears 19 at that side of the engine, transmit power to the gears, and as the two gears 19 at one side of the engine engage with the two gears 19 at the other side of the engine and two of the gears 19 at one side of the engine engage with the gears 25 of the drive shaft 24, power is transmitted to the drive shaft. Due to the fact that duplicate pins 22, rotors 18, gears 19, and gears 25 are provided at both the upper and lower portions of the engine, the power stroke is applied evenly and without torque, thereby unevenly distributing the power to the moving parts. As six power impulses are given to the engine during each complete revolution of the pistons 15 through their respective chambers A₁ and A₂, the power is very evenly applied so that a very smooth running engine is secured. Actually the power strokes are practically continuous as the engine is in operation.

To simplify the drawings, the lubrication and cooling systems for the engine are not shown, but in actual practice suitable lubrication and cooling systems will be provided. To multiply the power desired applied to a given drive shaft 24, it is merely necessary to duplicate the engine illustrated, placing the several engines in line and operating the same drive shaft from the multiplicity of engines. Preferably of course where multiple engines are employed, the timing of the respective engines will be so regulated as to stagger the power strokes of the several engines producing greater smoothness in the application of power.

It will be seen that a highly efficient engine has been provided which includes but very few moving parts and eliminates the use of a crank shaft, connecting rods, wrist pins, cam shaft, cams, exhaust and intake valves, and exhaust and intake ports employed in engines of standard construction today.

It will also be seen that a highly compact engine has been provided which will develop a high degree of power with a minimum of weight.

It will of course be understood that various changes may be made in the form, details, arrangement, and proportions of the various parts without departing from the scope of the present invention, which, generally stated, consists in the matter shown and described and set forth in the appended claims.

What is claimed is:

1. An internal combustion engine comprising a block having an annular chamber, a plurality of pistons located within said chamber for rotation therein, means for intermittently blocking off a zone of said chamber between adjacent pistons, guiding means driven by the pistons and guiding the pistons as they rotate to cause a timed relative movement between adjacent pistons in such manner that adjacent pistons draw apart as they approach said zone and draw together as they recede from said zone, there being a by-pass passage through said block affording communication between portions of said chamber adjacent the ends of said zone, means supplying a combustible mixture to said chamber at a portion thereof wherein adjacent pistons draw apart, means for conducting exploded gases from said chamber at a portion thereof wherein adjacent pistons draw together, means for igniting a charge in said chamber at a point just beyond said zone and a member in turn driven by said guiding means.

2. An internal combustion engine comprising a block provided with a circular piston chamber having intake, compression, blocking, firing, and exhaust zones, a plurality of pistons working in said chamber through the zones therein in the sequence in which said zones are named, said block having a by-pass passage running between the piston exit end of said compression zone and the piston entrance end of said firing zone, means for supplying a combustible charge to said intake zone, means for igniting the charge in the firing zone, means for conducting the spent charge from said exhaust zone, and means operated by said pistons and causing relative movement between adjacent pistons as they move through said chamber in such manner that as adjacent pistons move through said intake zone they will move away from each other and as adjacent pistons move through said exhaust zone they will move toward each other and means for intermittently blocking said blocking zone between the adjacent ends of adjacent pistons.

3. An internal combustion engine comprising a block provided with a circular piston chamber having intake, compression, blocking, firing, and exhaust zones, a plurality of pistons working in said chamber through the zones therein in the sequence in which said zones are named, said block having a by-pass passage running between the piston outlet end of said compression zone and the piston entrance end of said firing zone, means for supplying a combustible charge to said intake zone, means for igniting the charge in the firing zone, means for conducting the spent charge from said exhaust zone, and means driven by said pistons and rotating about an axis taken parallel and eccentric to the axis about which said circular piston chamber is evolved for guiding said pistons in their movement through said chamber in such relationship that, as the pistons move through said intake zone, the adjacent ends of adjacent pistons will have a relative movement away from each other, and as said pistons move through said exhaust zone the adjacent ends of adjacent pistons will have a relative movement toward each other, and means for intermittently blocking said blocking zone intermediate the adjacent ends of adjacent pistons.

4. The structure defined in claim 3, said blocking means comprising a series of secondary pistons driven in timed relation with the pistons moving through said chamber, said secondary pistons intermittently moving through said blocking zone in alternation with said first mentioned pistons.

5. An internal combustion engine comprising a block having an annular piston chamber therein, divided into intake, compression, blocking, firing, and exhaust zones, pistons working through said chamber in the sequence in which said zones are named, means operated by said pistons and guiding the movement of said pistons through said chamber to cause a relative movement of adjacent pistons away from each other as they travel through said intake zone and toward each other as they travel through said exhaust zone, said chamber having an intake port for introducing a charge into said intake zone and having an exhaust port for scavenging the spent charge from said exhaust zone, means for igniting the charge in said firing zone, said block having a by-pass passage having a receiving end leading into said chamber in said compression zone and a discharge end leading into said chamber in said firing zone, said pistons acting as valves to control said intake port, receiving and discharge ends of said by-pass passage and said exhaust port, and means for blocking off said blocking zone in alternation with movement of the pistons therethrough.

6. The structure defined in claim 5, a gear driven by said guiding means, and a power shaft driven by said gear.

7. The structure defined in claim 5, said guiding means including a rotor rotating about an axis parallel and eccentric to the axis about which said chamber is evolved, said rotor having guide slots, and members carried by said pistons and working in said slots.

8. An internal combustion engine comprising a block having a circular piston chamber forming an intake zone, a compression zone, a blocking zone, a firing zone, and an exhaust zone, a plurality of pistons working in said chamber through the zones thereof in the sequence in which said zones are named, said block having a by-pass passage running between the piston exit end of said compression zone and the piston entrance end of said firing zone, means for supplying a combustible charge to said intake zone, means for igniting the charge in said firing zone, means for conducting the spent charge from said exhaust zone, a rotor mounted for rotation about an axis eccentric and parallel to the axis about which said circular piston chamber is evolved, said rotor having radial guide slots within which portions of said pistons work to produce a relative movement of said pistons as they rotate in said piston chamber in such manner that adjacent pistons move apart as they pass through said intake zone and adjacent pistons move toward each other as they pass through said exhaust zone, a member working through said blocking zone and means for operating said last mentioned member in timed sequence with the movement of said pistons through said blocking zone and in such manner that said last mentioned member occupies the major portion of said blocking zone when said pistons do not occupy the same.

9. An internal combustion engine comprising a block having two circular piston chambers therein intersecting each other to form a common blocking zone, each chamber having intake, compression, firing, and exhaust zones and the common blocking zone of the two chambers being located between the compression and firing zones of the respective chambers, said block having by-pass passages respectively interconnecting the compression and firing zones of each chamber, piston regulating means receiving power from said pistons and controlling the movement of said pistons in such relation that the pistons working in the respective chambers alternately pass through said common blocking zone and the pistons in each chamber are given a relative movement to each other as they rotate so that adjacent pistons move away from each other as they pass through said intake zones and move toward each other as they move through said exhaust zones, means for supplying a combustible mixture to said intake zones, means for igniting the charge in the firing zones, and means for conducting the spent charges from said exhaust zones.

10. An internal combustion engine comprising a block having two circular piston chambers therein intersecting each other to form a common blocking zone, each chamber having intake, compression, firing, and exhaust zones and the common blocking zone of the two chambers being located between the compression and firing zones of the respective chambers, said block having by-pass passages respectively interconnecting the compression and firing zones of each chamber, piston guiding means for each chamber respectively mounted for rotation about an axis parallel and eccentric to the axis about which its circular piston chamber is evolved, said guiding means receiving power from the pistons while guiding the pistons in such relation that as the pistons work through the intake zones the adjacent ends of adjacent pistons will have a relative movement away from each other and as the pistons work through the exhaust zones adjacent ends of adjacent pistons will have a relative movement toward each other, and means causing said guiding means to be driven together in unison in such timed relation that the pistons of the two chambers work in alternation through said common blocking zone to alternately seal off communication between the compression zone and the firing zone of one chamber when a piston working in the other chamber passes through said common blocking zone, means for supplying a combustible mixture to the intake zones, means for igniting the charges in the firing zones, and means for conducting the spent charges from said exhaust zones.

11. The structure defined in claim 10, said guiding means including pins carried by said pistons and rotors having radial slots therein and respectively receiving the pins carried by the pistons working in the respective chambers.

12. The structure defined in claim 10, said chambers each having at least one side open, and sealing means working in conjunction with said pistons, and said guiding means to seal off the open sides of said chambers.

13. An internal combustion engine comprising a block having two circular piston chambers therein intersecting each other to form a common blocking zone, each chamber having intake, compression, firing and exhaust zones and the common blocking zone of the two chambers being located between the compression and firing zones of the respective chambers, said block having by-pass passages respectively interconnecting the compression and firing zones of each chamber, a plurality of pistons in each chamber mounted for rotation therein, pins carried by said pistons, rotors having guide ways receiving said pins and controlling the movement of said pistons in the respective chambers so that, as said pistons pass through said intake zones, adjacent pistons move away from each other, and as said pistons move through said exhaust zones, adjacent pistons move away from each other, means causing said rotors to be driven in unison in such timed relation that the pistons of the two chambers work in alternation through said common blocking zone, means for supplying a combustible mixture to said intake zones, means for igniting the charges in said firing zones, and means conducting the spent charges from said exhaust zones.

14. An internal combustion engine comprising a block having a pair of circular piston chambers therein intersecting each other to form a common blocking zone, each chamber having intake, compression, firing, and exhaust zones, and the common blocking zone of the two chambers being located between the compression and firing zones of the respective chambers, pistons working through said chambers, guiding means driven by said pistons and guiding the movement of said pistons through said chambers to cause a relative movement of adjacent pistons away from each other as they pass through said intake zones and toward each other as they pass through said exhaust zones, said chambers having intake ports for introducing charges into said intake zones and having exhaust ports for scavenging the spent charges from said exhaust zones, means for igniting the charges in said firing zones, said block having by-pass passages having receiving ends leading into said chambers in said compression zones and discharge ends leading into said chambers in said firing zones, said pistons acting as valves to control said intake ports, the receiving and discharging ends of said by-pass passages and said exhaust ports and means causing said guiding means to be driven together in such timed relation that successive pistons in the two chambers alternately work through said blocking zone.

15. The structure defined in claim 14, said last mentioned means comprising intermeshing gears operated by said guiding means, and a drive shaft driven by certain of said gears.

16. The structure defined in claim 14 and means sealing off said chambers at their sides.

17. An internal combustion engine comprising a block having two circular piston chambers therein intersecting each other to form a common blocking zone, each chamber having intake, compression, firing, and exhaust zones, and the common blocking zone of the two chambers being located between the compression and firing zones of the respective chambers, pistons working through said chambers rotating about the axes from which said chambers are evolved rotors respectively for the pistons of each chamber, said rotors being mounted in said block for rotation about axes parallel and eccentric to the axes about which said pistons revolve, said rotors having guide ways therein, members carried by said pistons and working in the guide ways of said rotors, the axes of said rotors being so located that, as said pistons move through said chambers, said cam tracks will cause a relative movement of adjacent pistons away from each other as they pass through said intake zones and toward each other as they pass through said exhaust zones, said chambers having intake ports for introducing charges into said intake zones and having exhaust ports for scavenging the spent charges from said exhaust zones, means for igniting the charges in said firing zones, said block having by-pass passages having receiving ends leading into said chambers in said compression zones and discharge ends leading into said chambers in said firing zones, said pistons acting as valves to control said intake ports, the receiving and discharge ends of said by-pass passages and said exhaust ports and means causing said rotors to be driven together in such timed relation that successive pistons in the two chambers alternately work through said common blocking zone.

LEIF A. HOLAN.
JOSEPH O. BOURDEAUX.

REFERENCES CITED

The following references are of record in the file of this patent:

UNITED STATES PATENTS

| Number | Name | Date |
|---|---|---|
| 1,850,904 | Woodward | Mar. 22, 1932 |

FOREIGN PATENTS

| Number | Country | Date |
|---|---|---|
| 192,999 | Great Britain | Feb. 11, 1922 |
| 55,885 | Sweden | Jan. 15, 1924 |